Patented Dec. 29, 1953

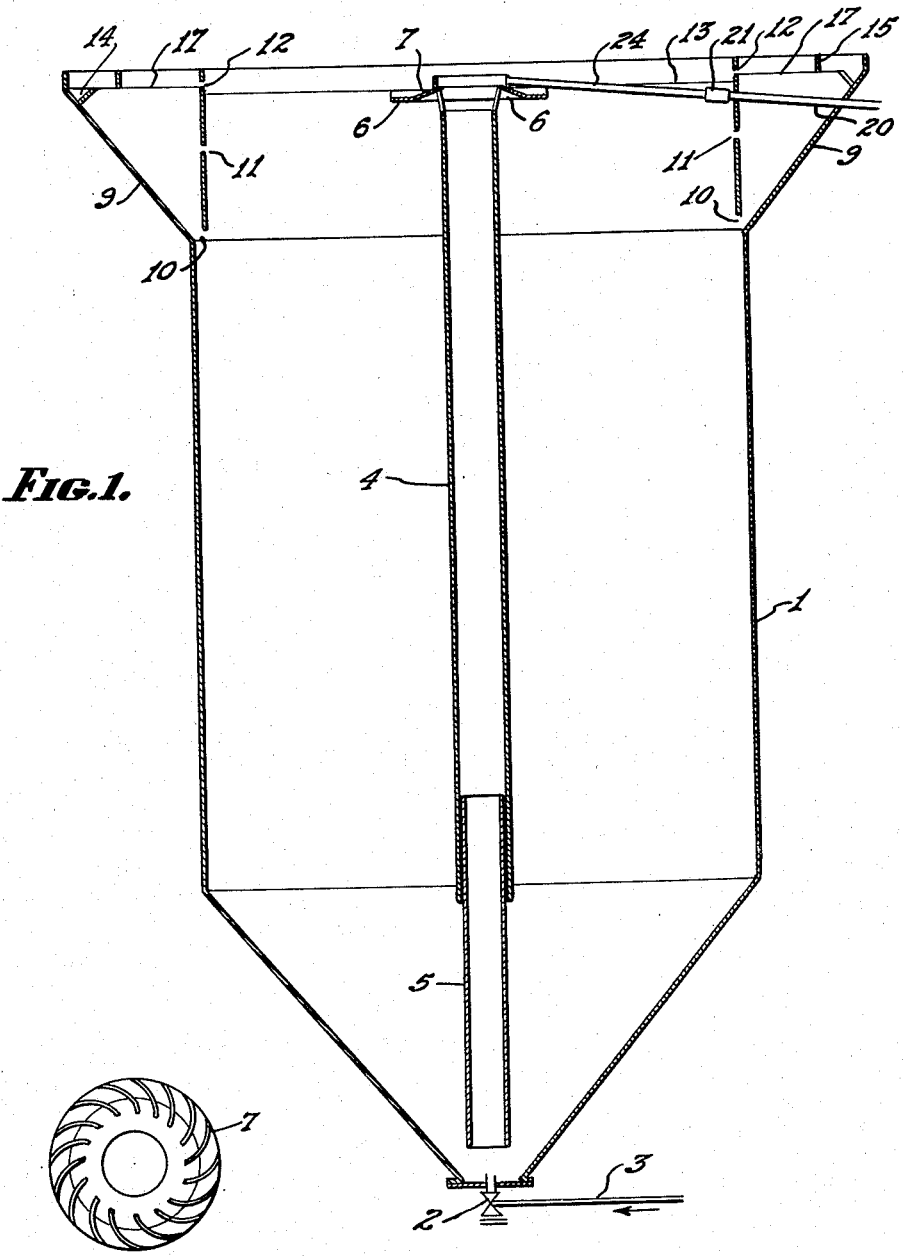

2,664,349

UNITED STATES PATENT OFFICE 2,664,349

METHOD OF PRECIPITATING SOLID PARTICLES FROM A SUSPENSION OF THE PARTICLES IN A LIQUOR

André Sablé, Marseille, France, assignor to Societe d'Electro-Chimie, d'Electro-Metallurgie et des Acieries Electriques d'Ugine, Paris, France, a corporation of France Application July 25, 1949, Serial No. 106,653

Claims priority, application France August 7, 1948

4 Claims. (Cl. 23—301)

The present invention relates to a method for insuring the maintenance of solids in suspension in a liquid and which furthermore permits a continuous circulation of the liquid phase independently of the movements of the solids. An apparatus for carrying out the method is illustrated herein, and is claimed in a divisional application Serial No. 206,327, filed January 17, 1951.

In order to effect the putting and the maintenance in suspension of a solid in a liquid it is possible to use mechanical stirring devices the movement of which creates eddies which cause a more or less homogeneous distribution of the solid to be maintained in suspension in the liquid.

It is also possible to admit to the bottom of the suspension vessel a rising current of compressed gas which also creates eddies. This method offers the advantage with respect to the preceding method, that contact with the mass to be stirred, by any mechanical member, is avoided.

In spite of their simplicity both these first methods are not very economical from the point of view of the consumption of power, since the major part of the energy which is used is dissipated in friction between the liquid veins.

It is also possible to create in the suspension vessel a rising current of liquid the speed of which is equal to, and in the opposite direction to the speed of the falling grains of the solid.

But this third method though more rational can be applied economically only with grains which are rather closely calibrated. As a matter of fact, the grains which are generally of an unequal size fall in the liquid at unequal speeds, the coarser grains falling more quickly. In order to maintain a rising current of liquid the speed of which is equal to that at which the grains fall, and opposite in direction, it is necessary, therefore, that said current have different speeds adapted to every grain size. This may be obtained by using a conical vessel. Indeed, the speeds of a liquid at the different levels of such a vessel are proportional to the cross-sections of said vessel, and rising speeds are thus obtained for the liquid which are in opposition to the falling speeds of the various grains. However, the vertex angle of the conical vessel must remain small (about 7°) since otherwise excessive eddies would be produced. Accordingly, the speeds of the liquid are comprised within a narrow range, corresponding, in the same manner, to only a narrow range in calibration of the grain size.

Lastly, it is possible to spread on the surface of the liquid the solid particles to be maintained in suspension therein, to allow said particles to fall freely through the whole height of the liquid, and then to collect them in the lower part in a state of a suspension which has been thickened or concentrated, and to raise them again to the surface by any mechanical method, for example by means of a pump.

This fourth method offers the following advantages with respect to the preceding methods:

(a) The power used in any case is proportional to the mean falling speed of the particles to be maintained in suspension, and no longer to the falling speed of the largest grains which is higher.

(b) It is possible to maintain in suspension a solid of any granulometric composition without any delicate adjustment.

(c) The available volume is better utilized and the suspension is more homogeneous. Indeed, the bad distribution of the grains which is caused by the other methods is avoided.

However, this fourth method still generally requires the use of a mechanical device (pump). Furthermore, it does not do away with the liquid-metal friction at a high speed.

The problems of putting and maintaining in suspension are particularly difficult of solution in a simple and economical manner for devices of large dimensions, more particularly in the case of dense grains having rather large dimensions (for example from a few tenths of $\mu$ to a few millimeters) and capable of decanting in a compact layer which is not very plastic, or not at all plastic (the grains coming into contact with one another and being no longer carried by the liquid phase).

In this state of sedimentation (for example resulting from an accidental stoppage of the power) it may happen that resuspension becomes impossible either because of impaction or an insufficient power of the mechanical elements or because the liquid eddies are ineffective to disintegrate the sedimented mass.

The present invention has for its object to provide a method and a device which make it possible to remedy these disadvantages and, furthermore, as will be seen later on, to obtain independence of the movements of the solids and the liquid.

The method in accordance with the invention essentially consists in insuring the suspension of the solid phase in the liquid in a vessel containing the liquid, by means of an injection of gas into the lower part of this vessel; in causing the so obtained suspension to rise in a continuous manner through a central tube, preferably a telescopic tube, the lower part of which can occupy an adjustable position with respect to the bottom of the vessel, up to the upper part of the device; and to allow a continuous decantation of the solid in said upper part by means of a device which comprises one or more decantation rings which communicate with the vessel in three superposed planes, the suspension entering the ring or rings through the median plane, the heavy particles returning to the circuit through the lower plane, the light particles or particles carrying air bubbles returning to the suspension through the upper plane which is located above the normal level of the liquid in the enclosed space, and the clear liquid being discharged through an overflow located substantially at the same height as the upper plane.

The device for carrying out the above described method fundamentally comprises, therefore, a vessel, preferably conical at its lower part, which is connected at said lower part to a source of compressed gas. Inside said vessel a preferably telescopic tube is vertically disposed in alignment with the gas supply, the lower opening of said tube being adjustable with respect to the bottom of the vessel. Its upper opening is provided with means for disengaging the emulsion and distributing the thick suspension over the whole surface of the vessel. The upper part of the vessel is surrounded by one or more preferably frusto-conical rings which communicate with the said vessel through a series of openings provided in three different horizontal planes, the upper plane lying above the normal level of the liquid in the vessel. The rings may be provided, on the one hand, with an overflow lying substantially at the same height as the above mentioned upper plane and, on the other hand, with a cylindrical ferrule the base of which lies slightly below the horizontal discharge level.

The method in accordance with the invention combines the advantages of simplicity of the second above mentioned method (absence of mechanical elements) with those of the fourth method (conservation of power, flexibility of use, homogeneousness of the suspension).

The conservation of power, more particularly, is enhanced to its maximum by the fact that the friction surfaces are reduced to a strict minimum by the substitution for friction between an incompressible liquid and a wall, of friction between a resilient emulsion and a wall, and to the elimination of friction at a high speed which consumes energy and gives rise to wear. This result is obtained by using gas compressed to a pressure which is very slightly higher than the hydrostatic pressure which opposes its outlet from the injection nozzles.

The device which is used is effectively an industrial device, for working incidents (unforeseen stoppages, clogging of the walls, casual presence of foreign bodies) entail only a minimum of inconveniences. It thus provides a practical and economical solution to the problems of the suspension of solids with a true sedimentation. The actuation of the movable lower part of the telescopic tube provides a powerful means for the disintegration of the sedimented mass to be brought into suspension.

Furthermore, the method may be adapted to a continuous operation even if, more particularly, the movements of feeding and discharging of the liquids and solids in suspension are such that they have to be effected independently of one another, or if the mean sojourn times for the liquid and the solid must be different, or if the operation comprises a plurality of phases which necessitate different working conditions, or yet again, if one and the same liquid must be successively in contact with different solid phases.

A continuous operation may be insured, even in complicated cases, by mounting in series as many devices as necessary and by providing, in each of said devices, for the independence of the supply and outlet movements of the liquid and of the solids.

This result is obtained by associating with each vessel containing the suspension, a special continuous settling device such as the device which will be described later on, and which fixes in position a small part of the volume in the form of a liquid which is more or less free from suspension, and makes possible not only the separation of the normal dense grains (returning through the lower part) but also that of the grains to which air bubbles adhere (returning through the upper part).

Lastly, the method in accordance with the invention makes possible, in the course of the operation with a continuous flow, a flexible and progressive granulometric sorting out of the grains or crystals in suspension.

The adaptability to progressive selection results:

(1) from the mode of circulation adopted for maintaining the solid in suspension, which makes possible a concentration, in the rising column, of the grains falling with the highest speed, and which thus may be discharged in a preferential manner by taking them off at any point of their travel. The so obtained selection is progressive if it is repeated with a plurality of devices in series.

(2) from the operation of the decanter which makes possible, for a given output, the carrying along of the solid particles falling with a speed which is lower than a predetermined limit, by the lye which flows through said decanter and which is discharged into the succeeding device.

The method in accordance with the invention may be used for all sorts of applications, more particularly when slow reactions are involved (thus, reactions requiring the carrying out of large masses) which may be physical, chemical or simply mechanical reactions between liquids and solids with or without intervention of a gas (which, when used in a more or less closed circuit, may act both as a reagent and as the driving fluid).

It may be used for the settling, sorting out, exhausting, or disintegration of solids, or even, because of its small consumption of energy, for the stocking and destocking of products which must or may be maintained in a wetted condition.

The possibilities of adjustment which it comprises (position of the movable part of the telescopic tube) make it possible to vary at will the relative richness of the product in suspension in the rising column (from whence it is possible to effect the extraction) with respect to that of the remainder of the vessel.

It is possible, for example, to decant with a constant richness (solid/liquid) in spite of variations in the total quantity of solid in suspension in the whole of the device.

The invention may be applied in a particularly interesting manner to the decomposition, in a continuous operation, of sodium aluminate lyes in the method of Bayer. The description thereof, which is given hereunder, by way of nonlimitative example, will contribute to a better understanding of the object and of the form of execution of the invention.

It is known that the use of continuous devices for the decomposition of the sodium aluminate lyes of Bayer offers numerous advantages over the discontinuous treatment, such as elimination of dead times, control of the granulometry, saving in the volume of lye which is fixed in position, and of the sheet metal surface of the precipitators.

It is also known that in order to obtain both high volumetric efficiencies and a good exhausting of the lye, the operation must be conducted successively in a plurality of precipitators mounted in series, and in which the sodium aluminate lye is decomposed through hydrolysis with a crystallization of alumina hydrate on already formed nuclei.

The precipitation of Bayer has the characteristic that in order to reconcile high volumetric efficiencies with the production of well developed hydrate crystals it is necessary to maintain in suspension an important quantity of these already formed nuclei (at least 200 grams per litre).

Now, the aluminate lye gives up during its passage through all of the precipitators only 70 to 85 grams of hydrate per litre (in three to six days). Moreover, this quantity is fractionated in each of the devices, the most favoured of which (that placed at the head of the series) fixes on its starting 200 grams, 30 to 35 grams of hydrate extracted from the liquid phase of the suspension.

In order to maintain in suspension a starting quantity of alumina which is higher than the precipitable quantity it is, therefore, not possible to cause this suspension itself to flow from one decomposer into a succeeding one and so on to the discharge. To this end it would be necessary constantly to renew the head, starting with an important supply, for example by means of a starting recycling taken off at the end of the operation.

But, besides the material complications which such an operation involves, it is accompanied, (if the movements of the re-cycled hydrate are effected in suspension in an exhausted lye), by the inconvenience of reducing, through the mixture of this weak lye with the aluminate, the alumina/soda ratio in the lye of the head device as well as the mean sojourn time of the lye in each of the succeeding devices and thus reducing the volumetric efficiency of the whole unit.

According to the invention, it is then necessary to make independent of each other in each precipitator the movements of the liquid (sodium aluminate lye coming from the preceding precipitator) and of the solid (starting nuclei and alumina hydrate already formed in the same precipitator) and thus to apply the above described general method of putting solids in suspension.

However, since the most practical method for conveying the alumina is to effect this in the form of a thickened suspension in the lye which carries it, it will then be necessary to discharge the alumina only from the last precipitator of the series, in which the supporting lye is nearly completely exhausted. Thus, the alumina formed in the other devices is collected in the last device as its own production proceeds in the latter.

In the accompanying drawings an example of execution of the device in accordance with the invention is shown which is particularly adapted to the decomposition of sodium aluminate in the method of Bayer. In said drawings:

Figure 1 is a diagrammatical view showing a precipitator in accordance with the invention.

Figure 2 is a plan view showing the blade wheel in the upper part of the central tube.

Figure 3:
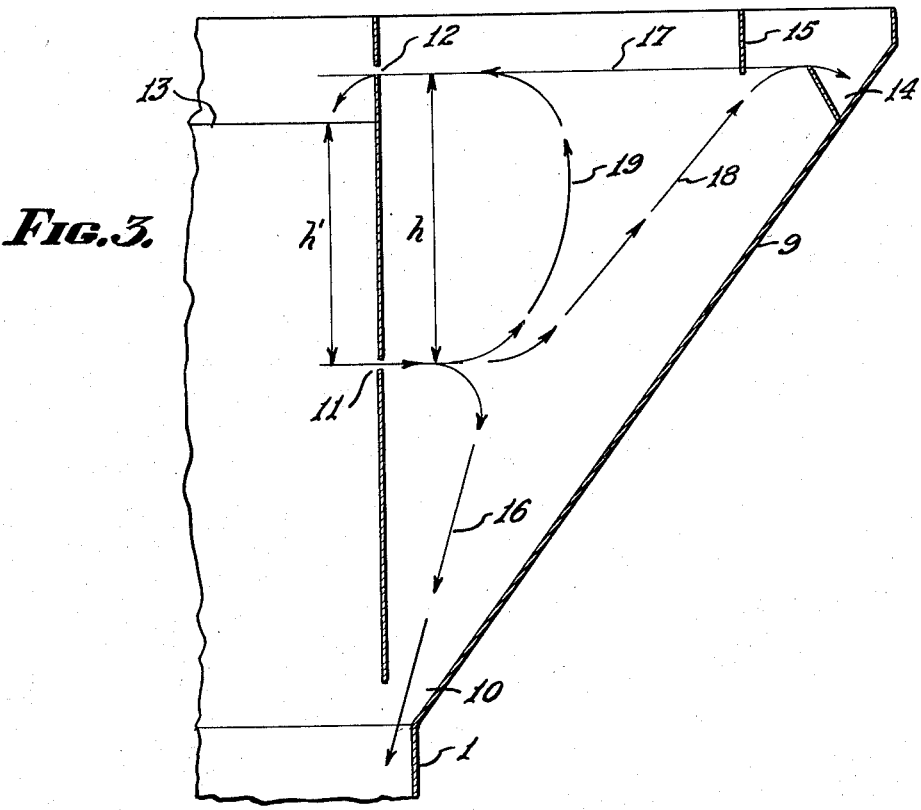
Figure 3 is a detail of Figure 1 on a larger scale showing the separation of the lye from the alumina.

Referring to the drawings, the precipitator shown in Figure 1 comprises a part cylindrical, part conical container 1 designed so that its ratio of volume/surface makes possible an elimination of heat sufficient to determine the reduction of solubility of the alumina in the lye, together with a mean sojourn time of the aluminate molecules which is sufficient, on the one hand, to make it possible for the molecular modifications in the decomposition (hydrolysis) to occur and, on the other hand, to fix the alumina, which said molecular modifications rendered insoluble, on the starting nuclei after a transitory stage of metastable oversaturation. This latter operation also depends on the quantity of nuclei in suspension and on the contact surface of said nuclei with the lye.

In temperate regions (mean surrounding temperature of 15° C.) and when only convection and radiation in free air are used to eliminate the heat, the optimum ratios (volume/surface) are comprised between 1 and 1.3. Of course they may be determined for those cases in which operations are carried on under other climatic conditions, or for those cases in which the cooling method would be changed.

Placed in the lower part of the room is an emulsifying cock valve 2 which is connected to a branch pipe 3 for the supply of compressed air.

In container 1 and coaxial with it is a telescopic tube 4—5 the upper part 4 of which is stationary, while the lower part 5 is movable inside the part 4. Secured at the top of this latter part are a sheet-metal piece 6 and a blade wheel 7 provided in their center with an opening the diameter of which is slightly larger than that of the tube 4 and the height of which is adjusted so that one part of the emulsion may be deflected by the lower face of the sheet-metal piece and of the blade wheel while the other part falls back on their upper face.

The upper part of container 1 is surrounded by a frusto-conical ring 9 which communicates with said container through a series of openings provided in three different horizontal planes at 10, 11 and 12. The plane of openings 12 is above the normal level 13 of the liquid in container 1.

The frusto-conical ring 9 comprises an overflow 14 the discharge plane of which is at the same height as the openings 12. A cylindrical ferrule 15 is also located in the ring so that its base is slightly below said discharge plane.

The alumina particles arriving at the bottom of container 1 are brought to the form of an emulsion by means of compressed air coming through the pipe 3. The quantity of compressed air which is necessary for the production of this emulsion, the density of which must be lower than the mean density of the hydrate-lye suspension in container 1, is calculated proportionally to the quantity of hydrate which decants in a unit of time and which is itself proportioned:

To the cylindrical section of the precipitator;

To the mean speed of fall of the particles;

To the mean concentration (ratio alumina hydrate/alumina lye) which it is desired to maintain in the whole of the device for reasons of efficiency and with a view to adjusting the granulometric composition of the alumina; and To the ratio alumina hydrate/alumina lye in the emulsion; this latter ratio is limited, moreover, for reasons of a practical order.

The emulsion which forms rises through the telescopic tube 4—5 to the upper part of the container, and in this manner the diffusion of the air in the remainder of the vat, on the one hand, and, on the other hand, the eddies which would be produced by the friction of the rising emulsion column against the remainder of the suspension to which a slight downward movement is imparted, are avoided.

The fact that the tube is a telescopic tube makes it possible:

(a) To adjust its optimum position in operation depending on the clogging of the device and the richness of the emulsion which it is desired to obtain. The richness will be the higher, all other conditions remaining the same, the narrower the space between the lower part of the tube and the bottom of the container.

This latter adjustment is obtained through a variation of the section of passage offered to the liquid between the end of the movable tube 5 and the stationary wall of the vat.

(b) Completely to raise its movable lower part 5 in case of a stoppage in order to avoid jamming it in the decanted solid mass and to facilitate the resumption of operation;

(c) To replace said inner part 5, if necessary, without interrupting the operation of the decomposer.

The emulsion which arrives at the upper part of tube 5 is discharged and distributed over the whole surface of the container through the sheet-metal piece 6 or wheel 7. It is possible to obtain a very homogeneous distribution since the difference of the ratios (solid/liquid) in samples taken on one and the same horizontal plane does not exceed 5%. The emulsion is then settled into the annular space 9 which it enters through openings 11. It there separates, first, into a clear liquid which is discharged through overflow 14, second, into light particles carrying air bubbles which return to the upper part of the liquid through openings 12, and third, into heavy particles which return to said liquid through openings 10.

Indeed, the hydrostatic equilibrium in the whole of the device may be represented in the following manner:

One may suppose that the cylindrical part of the decomposer is filled with a homogeneous suspension containing 200 grams of alumina hydrate having a density of 2.3 per litre of suspension with a density of 1.2.

Under these conditions the weight of one litre of the suspension is equal to:

$$0.200 + 1.200\left(1 - \frac{0.200}{2.3}\right) = 1.295$$

nuclei    lye

There is a communication between said cylindrical part and the frusto-conical ring through openings 10 and 11 but the equilibrium will be broken, for in the conical part the alumina decants in the proportion of X grams per litre and per unit of time and the density in the region of this conical part included between the horizontal planes of openings 10 and 11 becomes:

$$0.200 + X + 1.200\left(1 - \frac{0.200 + X}{2.3}\right) = 1.295 + X$$

nuclei    alumina    lye

This difference of density generates a current flowing from openings 11 toward openings 10 in accordance with arrow 16 as a result of which the alumina introduced through openings 11 in the form of a normal suspension is reintroduced at 10 in the form of a slightly thickened suspension.

In order that hydrostatic equilibrium may be maintained at openings 11, level 17 being invariable (overflow) the suspension having a density of 1.295 which occupies the precipitator proper enters the frusto-conical decantation ring 9 through openings 11 and forces out the liquid of density 1.200 which is between the planes of openings 11 and 12 and which flows out through the overflow 14 in the direction of arrow 18 while the alumina separated by decantation returns to the decomposer through openings 10.

This process comes to a stop only when level 13 which limits in free air the height of the suspension in the precipitator becomes such that $h' \times 1.295 = h \times 1.200$, $h$ and $h'$ being the distances from openings 11 to the levels of the liquids in ring 9 and in decomposer 1 respectively.

It is resumed as soon as the precipitator receives a quantity of lye which tends to break said equilibrium.

In normal operation, there is therefore always between precipitator 1 and settling ring 9 a level difference $h - h'$ which is proportioned to the fixed height $h$ and to the richness in solid of the hydrate suspension in the main body.

This level difference creates a slight current of lye which flows in the direction of arrow 19 and returns to vessel 1 through openings 12, the floating alumina which, otherwise, would form skins on the surface in free air of the frusto-conical ring, which would interfere with settling and cause clogging and choking.

This floating alumina is formed of hydrate grains having provisionally fixed small air bubbles which carry them to the surface. Stopped by the ferrule 15 which opposes its horizontal movement toward the outside it cannot be discharged through overflow 14.

Only the liquid which is perfectly free from any alumina in suspension is discharged through overflow 14.

It is known that in the Bayer decomposition the solid (in the present case the alumina hydrate produced in a decomposer and a certain quantity of starting alumina remaining in the latter) is led to the succeeding precipitator in the form of a suspension of crystals in the lye.

Now, there is advantage in conveying the alumina in a state of suspension which is as dense as possible (that is to say with the highest ratio solid/liquid). For one and the same quantity of hydrate, the volume to be conveyed is the smaller, the thicker the suspension. This feature is of a particular interest in relation to the final extraction intended for feeding the rotary filters, for the use of a thick suspension promotes the formation of the layer on the filter.

Moreover, the independence of the movements of the lye and of the hydrate in accordance with the invention makes it possible to maintain, at will, a smaller or larger weight of hydrate in suspension in the whole precipitator unit, and thus constitutes an excellent stocking and destocking means. This is all the more so because it is possible either to distribute the starting alumina evenly in each of the vats or to concentrate it in one vat or in another.

During a destocking period, for example, it is possible, in order to be able to dispose of a thick suspension at the feeding of the filters, to concentrate a large part of the hydrate in the vat in which the final extraction is effected.

In drawing off the alumina where the ratio (solid/liquid) is the highest we have found that the most suitable way consists in effecting this drawing off in the neighbourhood of the top of the rising column of emulsion (air-solid-liquid).

This mode of proceeding has the further advantage that since the increase in concentration in the emulsion is more particularly substantial for the largest crystals, and since the drawing off of hydrate is effected on the rising column at each stage of decomposition, there results a progressive selection which accelerates the extraction of the most developed crystals and leaves the others time to increase.

The difference between the concentration of the rising emulsion and the mean concentration may be chosen by varying the quantity of lye delivered into the emulsion through an adjustment of the position of the lower part 5 of the telescopic tube with respect to the stationary wall of the vat.

Figure 4:
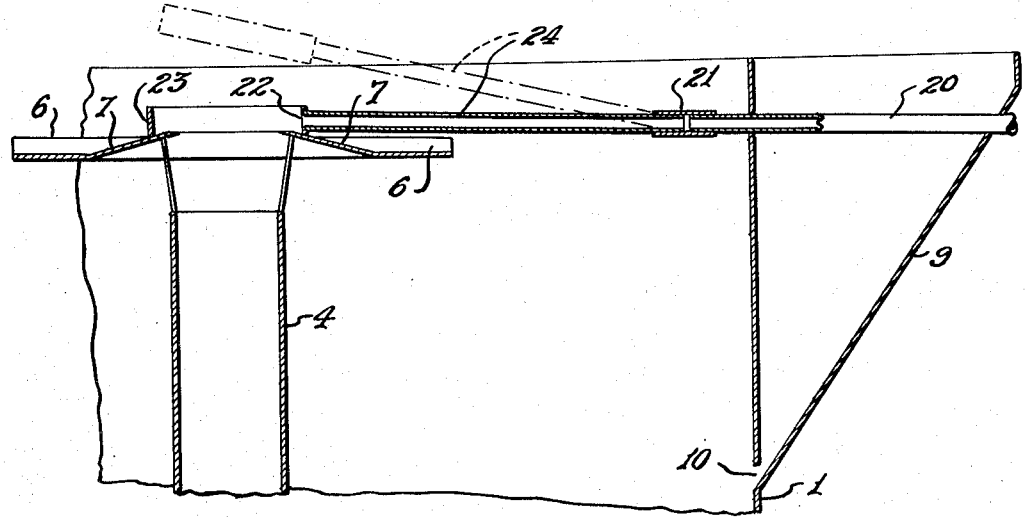
Figure 4 is another detail of Figure 1 on a larger scale showing the drawing off of the hydrate.

A very simple and very practical device for drawing off the suspension of alumina at will is shown in Figure 4.

This device comprises a tube 20 for the evacuation of the suspension to be drawn off, which tube passes through the wall of the precipitator 1 at a few decimeters below the discharging plane 17. Inside said precipitator and near this wall the tube is swingably mounted, for example by means of a rubber sleeve 21, permitting a swinging movement of 5 to 10° in the vertical plane.

The free end of this tube comprises a grating 22 which prevents the introduction of crusts or foreign bodies, and a sheet-metal ring 23, the diameter of which is slightly larger than that of the axial tube 4.

At rest, this end of the tube and the ring 23 are maintained by means of a rope 24 out of contact with the liquid mushroom formed by the emulsion current issuing from the axial tube and spreading over the sheet-metal piece 6 or the distribution wheel 7.

Under these conditions nothing passes through tube 20 and the output of the precipitator is discharged through overflow 14 in the state of a decanted lye.

On the contrary, when it is desired to effect an extraction of alumina it is sufficient to lower tube 20 and ring 23 upon the sheet-metal piece or the distribution wheel. The ring, while interfering with the establishment of the emulsion mushroom, then leads toward the opening of the tube the thick suspension of alumina which, on account of the slope, is discharged simply through gravity.

In order to stop the drawing off, the ring and the tube are again raised to the position of rest through pivoting around rubber sleeve 21.

This device which makes it possible to effect all handlings in free air, avoids the use of mechanical elements and of valve fittings as well as of pumps and even of sluice-gates which can always be clogged or choked.

These advantages are more particularly important for suspensions, in an incompletely decomposed lye, of crystallized alumina hydrate the grains of which have a diameter which is larger than 100 millimeters for, under these conditions, the least interruption of movement or the least dead space cause the heaping up of decanted masses, the grains of which stick together in a very short time.

From the above description it may be seen that the general method for putting a dense solid in suspension in a liquid in accordance with the invention makes it possible:

(a) To obtain a very important saving (of more than 50%) of the power which would be necessary to obtain the same result with a mechanical stirring device;

(b) To maintain in suspension a large quantity of a solid of any granulometric composition and to distribute it in a homogeneous manner in all the liquid volume of the device;

(c) To achieve a continuous operation since the movements of the solid and the liquid are completely independent of each other;

(d) To obtain the progressive selection of the grains;

(e) To attain these results through particularly simple means which comprise no mechanical element in contact with products to be treated (doing away with wear and maintenance).

Furthermore, the application of this method to the decomposition through a continuous operation, of the sodium aluminate lyes according to the method of Bayer, makes it possible besides the saving of power and maintenance as mentioned above:

(a) To effect savings in volume of the device, and of lye held stationary, reaching 30 to 35%;

(b) To control the granulometry of the obtained product and to use fine nuclei prepared separately, the renewal of the nuclei being no longer left to the chance of self-precipitation;

(c) To obtain hydrate grains with a radiating structure which makes it possible to increase the efficiency of the calcining ovens;

(d) To save a considerable part of the initial expenses by doing away with the mechanical elements or pumps used with previously known methods.

What I claim is:

1. A method of precipitating solid particles from a suspension of the particles in a liquor, which comprises establishing a column of such a suspension-containing liquor in an open-top vessel, from which the particles are to be precipitated, and in which is contained a quantity of precipitated particles, providing a centrally located air lift extending from adjacent the bottom of the column to the top thereof, injecting air under pressure into the bottom of the air lift and withdrawing liquor containing precipitated particles from adjacent the bottom of the column and moving the said liquor upwardly through the air lift to the top of the column, overflowing the liquor moved upwardly through the air lift and directing the overflow outwardly in the vessel toward a decanting zone surrounding the upper portion of the said column of liquor, said decanting zone having a downwardly inclined lower surface sloping inwardly to the said column, said decanting zone being substantially isolated from the said column of liquor by means of a vertically disposed continuous annular baffle which circumscribes the air lift at substantially the perimeter of the said column and is perforated only at three different horizontal levels—one level above the level of the overflowed liquor adjacent the air lift, a second level at the bottom of said decanting zone, and a third level intermediate the said first and second levels, introducing the said overflowed liquor into the decanting zone through the intermediate level of perforations in the baffle, and withdrawing a relatively clear liquor as overflow from the periphery of the upper surface of the liquor in the decanting zone, by concurrently precipitating particles from the liquor in the decanting zone and returning the precipitated particles to the said column through the lowermost level of perforation in the baffle and returning liquor containing relatively fine precipitated particles surrounded by air bubbles to the said column of liquor through the uppermost level of perforations in the baffle, the level of the said uppermost level of perforations in the baffle and the level of the overflow periphery of the decanting zone being the same and chosen relative to the level of the overflowed liquor adjacent the air lift so as to provide for a relatively clear overflow from the periphery of the decanting zone.

2. In a method according to claim 1 the step of adding fresh condensation nuclei to the liquor in the column.

3. A method according to claim 2 in which the condensation nuclei are hydrated alumina and the liquor in the column is a solution of sodium aluminate.

4. A method according to claim 3 in which the proportion of condensation nuclei introduced and maintained in suspension is at least 200 grams per liter of suspension liquor.

ANDRÉ SABLÉ.

References Cited in the file of this patent

UNITED STATES PATENTS

| Number | Name | Date |
|---|---|---|
| Re. 13,668 | Fickes | Jan. 6, 1914 |
| 994,679 | Hills | June 6, 1911 |
| 1,076,666 | Dorr | Oct. 28, 1913 |
| 1,351,155 | Brown | Aug. 31, 1920 |
| 1,434,232 | Sherwood | Oct. 31, 1922 |
| 1,732,893 | Hunt | Oct. 22, 1929 |
| 1,847,659 | Maclennan | Mar. 1, 1932 |
| 1,952,727 | Ralston | Mar. 27, 1934 |
| 2,385,128 | Castner | Sept. 18, 1945 |
| 2,422,499 | Pierce | June 17, 1947 |
| 2,436,509 | Haust | Feb. 24, 1948 |
| 2,438,204 | Castner | Mar. 23, 1948 |
| 2,460,987 | Kanhofer | Feb. 8, 1949 |